(12) United States Patent
Kaur et al.

(10) Patent No.: US 12,051,259 B2
(45) Date of Patent: Jul. 30, 2024

(54) METHOD AND SYSTEM FOR PROCESSING SUBPOENA DOCUMENTS

(71) Applicant: JPMorgan Chase Bank, N.A., New York, NY (US)

(72) Inventors: Simerjot Kaur, Jersey City, NJ (US); Armineh Nourbakhsh, Brooklyn, NY (US); Brian Bramble, Elkton, MD (US); Sameena Shah, Scarsdale, NY (US); Daniel Borrajo, Pozuelo de Alarcon (ES)

(73) Assignee: JPMORGAN CHASE BANK, N.A., New York, NY (US)

( * ) Notice: Subject to any disclaimer, the term of this patent is extended or adjusted under 35 U.S.C. 154(b) by 521 days.

(21) Appl. No.: 17/317,114

(22) Filed: May 11, 2021

(65) Prior Publication Data

US 2022/0366168 A1 Nov. 17, 2022

(51) Int. Cl.
*G06V 30/416* (2022.01)
*G06F 16/2458* (2019.01)
(Continued)

(52) U.S. Cl.
CPC ........ *G06V 30/416* (2022.01); *G06F 16/2468* (2019.01); *G06F 16/338* (2019.01);
(Continued)

(58) Field of Classification Search
CPC .. G06V 30/416; G06V 30/10; G06F 16/2468; G06F 16/338; G06F 40/295; G06F 40/56; G06N 20/00
See application file for complete search history.

(56) References Cited

U.S. PATENT DOCUMENTS 6,975,996 B2 * 12/2005 Lawrence .............. G06Q 10/10
707/999.001
11,163,836 B2 * 11/2021 Ray ...................... G06F 16/338
(Continued)

OTHER PUBLICATIONS

Bommarito II, Michael J., Daniel Martin Katz, and Eric M. Detterman. "LexNLP: Natural language processing and information extraction for legal and regulatory texts." arXiv preprint arXiv:1806.03688 (2018). (Year: 2018).*

(Continued)

*Primary Examiner* — Brian L Albertalli
(74) *Attorney, Agent, or Firm* — Greenblum & Bernstein, P.L.C.

(57) ABSTRACT

A method and a system for extracting information from a subpoena document are provided. The method includes: receiving a subpoena document; extracting raw text included in the subpoena document; identifying, based on the extracted raw text, entities that are named in the subpoena document; determining, based on the extracted raw text, first information that relates to a scope period, a law enforcement agency, and/or an investigative agent associated with the subpoena document; retrieving second information that relates to the identified entities from a customer database; and outputting a subset of the determined first information and a subset of the obtained second information. The method may also include using a weighted fuzzy name match algorithm to match the identified entities with the second information.

17 Claims, 10 Drawing Sheets

(51) Int. Cl.
  *G06F 16/338* (2019.01)
  *G06F 40/295* (2020.01)
  *G06F 40/56* (2020.01)
  *G06N 20/00* (2019.01)
  *G06V 30/10* (2022.01)

(52) U.S. Cl.
  CPC ............ *G06F 40/295* (2020.01); *G06F 40/56* (2020.01); *G06N 20/00* (2019.01); *G06V 30/10* (2022.01)

(56) References Cited

U.S. PATENT DOCUMENTS

| | | | | |
|---|---|---|---|---|
| 11,170,055 B2* | 11/2021 | Hutchins | ................ | G06N 20/00 |
| 2002/0007358 A1 | 1/2002 | Johnson et al. | | |
| 2002/0103834 A1* | 8/2002 | Thompson | ............ | G06F 40/284 |
| | | | | 715/256 |
| 2003/0069742 A1 | 4/2003 | Lawrence | | |
| 2004/0199555 A1* | 10/2004 | Krachman | ............. | G06Q 50/26 |
| 2006/0004866 A1 | 1/2006 | Lawrence et al. | | |
| 2008/0091674 A1* | 4/2008 | Allen | ................... | G06F 40/295 |
| 2012/0095890 A1 | 4/2012 | Santarlas | | |
| 2012/0254222 A1* | 10/2012 | Read | ..................... | G06Q 10/10 |
| | | | | 707/769 |
| 2012/0265762 A1* | 10/2012 | Wade | ................... | G06V 30/224 |
| | | | | 707/741 |
| 2013/0305149 A1* | 11/2013 | Dimitrov | ................ | G06F 16/34 |
| | | | | 715/273 |
| 2014/0108274 A1* | 4/2014 | Sherfey | .................. | G06Q 50/18 |
| | | | | 705/311 |
| 2014/0244524 A1* | 8/2014 | Brestoff | ................ | G06F 40/211 |
| | | | | 705/311 |
| 2017/0270115 A1 | 9/2017 | Cormack et al. | | |
| 2021/0004521 A1* | 1/2021 | Jones | ................... | H04L 9/3247 |
| 2021/0065320 A1* | 3/2021 | Bleiweiss | ............. | G06F 40/289 |
| 2021/0209551 A1* | 7/2021 | Navarra | .................. | G06F 16/93 |
| 2022/0012830 A1* | 1/2022 | Zernik | ................... | G06F 40/30 |

OTHER PUBLICATIONS

Zeni et al., "Applying GaiusT for Extracting Requirements from Legal Documents" 2013 6th International Workshop on Requirements Engineering and Law, IEEE, 2013, dated Jul. 16, 2013.
International Search Report and Written Opinion in corresponding International Patent Application No. PCT/US2021/031728, dated Aug. 5, 2021.

* cited by examiner

METHOD AND SYSTEM FOR PROCESSING SUBPOENA DOCUMENTS

BACKGROUND

1. Field of the Disclosure

This technology generally relates to methods and systems for processing subpoena documents, and more particularly to methods and systems for processing unstructured subpoena documents to extract relevant information regarding target entities, law enforcement agencies, and crime categories.

2. Background Information

Large financial institutions have a need to process and investigate thousands of unstructured subpoena documents. The problem at hand is that a firm manually extracts target information from these unstructured subpoena documents and then performs manual entity resolution for each target. This problem is compounded by the fact that there are a lot of instances where 1) a single document might contain hundreds of targets and their unique identifiers and hence manually extracting and resolving them is a very lengthy process; or 2) a document is extremely long and verbose and might contain a single entity, which makes manual extraction and resolution akin to finding a needle in a haystack.

This manual extraction and resolution effort requires a substantial amount of human resources and hence is costly and time consuming for a financial institution.

Accordingly, developing an automated end-to-end subpoena target extraction and entity resolution pipeline would be greatly impactful. However, as is often the case with most ambitious artificial intelligence (AI) tasks, this has its own native challenges. First, most of the subpoena documents are in PDF format, and most are scanned or image pdfs, hence the performance of the model is heavily dependent on the Optical Character Recognition software tool which is being used to extract the raw text.

Second, and most importantly, there is no gold standard template for the structure or contents in a subpoena. Sense making from these visually and linguistically unstructured documents is the main challenge.

A third challenge is to extract relevant information regarding the target entities, their unique identifiers, law enforcement agencies, and other important information from these unstructured documents.

A fourth challenge is to draw an inference of the reasons behind the subpoena, as well as a crime category, from unstructured raw subpoena text.

A fifth challenge is to obtain a resolution of each target entity from amongst voluminous internal customer databases.

The aforementioned challenges make it clear that this is by no means a task that merely requires a machine to efficiently execute a set of tasks alone. The machine requires non-trivial processing to perform various levels of human-like intelligent tasks such as filtering excess verbiage, understanding context, and extracting and resolving each target entity from highly unstructured text.

SUMMARY

The present disclosure, through one or more of its various aspects, embodiments, and/or specific features or sub-components, provides, inter alia, various systems, servers, devices, methods, media, programs, and platforms for processing unstructured subpoena documents to extract relevant information regarding target entities, law enforcement agencies, and crime categories.

According to an aspect of the present disclosure, a method for processing unstructured subpoena documents to extract relevant information regarding target entities, law enforcement agencies, and crime categories is provided. The method is implemented by at least one processor. The method includes: receiving, by the at least one processor, a subpoena document; extracting, by the at least one processor, raw text included in the subpoena document; identifying, by the at least one processor based on the extracted raw text, at least one entity that is named in the subpoena document; determining, by the at least one processor based on the extracted raw text, first information that relates to at least one from among a scope period associated with the subpoena document, a law enforcement agency associated with the subpoena document, and an investigative agent associated with the subpoena document; obtaining, by the at least one processor, second information that relates to the identified at least one entity; and outputting, by the at least one processor, a subset of the determined first information and a subset of the obtained second information.

The extracting of the raw text may include scanning the subpoena document with a device configured to perform an optical character recognition operation.

Each of the identifying of the at least one entity and the determining of the first information may be performed by using a machine learning algorithm that applies a Natural Language Processing (NLP) technique to the extracted raw text.

The obtaining of the second information may include retrieving the second information from a database that includes customer-specific information.

The second information may include at least one from among a name of a person, a name of a company, a date of birth, a social security number, a tax identification number, an account number, an address of a location, and an organization associated with the identified at least one entity.

The method may further include matching the identified at least one entity with a name retrieved from the database that includes the customer-specific information by using a weighted fuzzy name match algorithm.

The method may further include inferring a crime category associated with the subpoena document based on the determined first information.

The method may further include obtaining third information that includes at least one from among a transaction history of the identified at least one entity, historical investigation information that relates to the identified at least one entity, know your customer (KYC) information that relates to the identified at least one entity, a suspicious activity report (SAR) that relates to the identified at least one entity, and negative media information that relates to the identified at least one entity.

The method may further include generating a report that includes information that is responsive to requests included in the subpoena document based on the obtained second information and the obtained third information.

According to another exemplary embodiment, a computing apparatus for extracting information from a subpoena document is provided. The computing apparatus includes a processor; a memory; and a communication interface coupled to each of the processor and the memory. The processor is configured to: receive, via the communication interface, a subpoena document; extract raw text included in the subpoena document; identify, based on the extracted raw text, at least one entity that is named in the subpoena document; determine, based on the extracted raw text, first information that relates to at least one from among a scope period associated with the subpoena document, a law enforcement agency associated with the subpoena document, and an investigative agent associated with the subpoena document; obtain second information that relates to the identified at least one entity; and output a subset of the determined first information and a subset of the obtained second information.

The processor may be further configured to extract the raw text by scanning the subpoena document with a device configured to perform an optical character recognition operation.

The processor may be further configured to perform each of the identifying of the at least one entity and the determining of the first information by using a machine learning algorithm that applies a Natural Language Processing (NLP) technique to the extracted raw text.

The processor may be further configured to retrieve the second information from a database that includes customer-specific information and is stored in the memory.

The second information may include at least one from among a name of a person, a name of a company, a date of birth, a social security number, a tax identification number, an account number, an address of a location, and an organization associated with the identified at least one entity.

The processor may be further configured to match the identified at least one entity with a name retrieved from the database that includes the customer-specific information by using a weighted fuzzy name match algorithm.

The processor may be further configured to infer a crime category associated with the subpoena document based on the determined first information.

The processor may be further configured to obtain third information that includes at least one from among a transaction history of the identified at least one entity, historical investigation information that relates to the identified at least one entity, know your customer (KYC) information that relates to the identified at least one entity, a suspicious activity report (SAR) that relates to the identified at least one entity, and negative media information that relates to the identified at least one entity.

The processor may be further configured to generate a report that includes information that is responsive to requests included in the subpoena document based on the obtained second information and the obtained third information.

According to yet another exemplary embodiment, a non-transitory computer readable storage medium storing instructions for extracting information from a subpoena document is provided. The storage medium includes executable code which, when executed by a processor, causes the processor to: receive a subpoena document; extract raw text included in the subpoena document; identify, based on the extracted raw text, at least one entity that is named in the subpoena document; determine, based on the extracted raw text, first information that relates to at least one from among a scope period associated with the subpoena document, a law enforcement agency associated with the subpoena document, and an investigative agent associated with the subpoena document; obtain second information that relates to the identified at least one entity; and output a subset of the determined first information and a subset of the obtained second information.

The executable code may be further configured to cause the processor to perform each of the identifying of the at least one entity and the determining of the first information by using a machine learning algorithm that applies a Natural Language Processing (NLP) technique to the extracted raw text.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
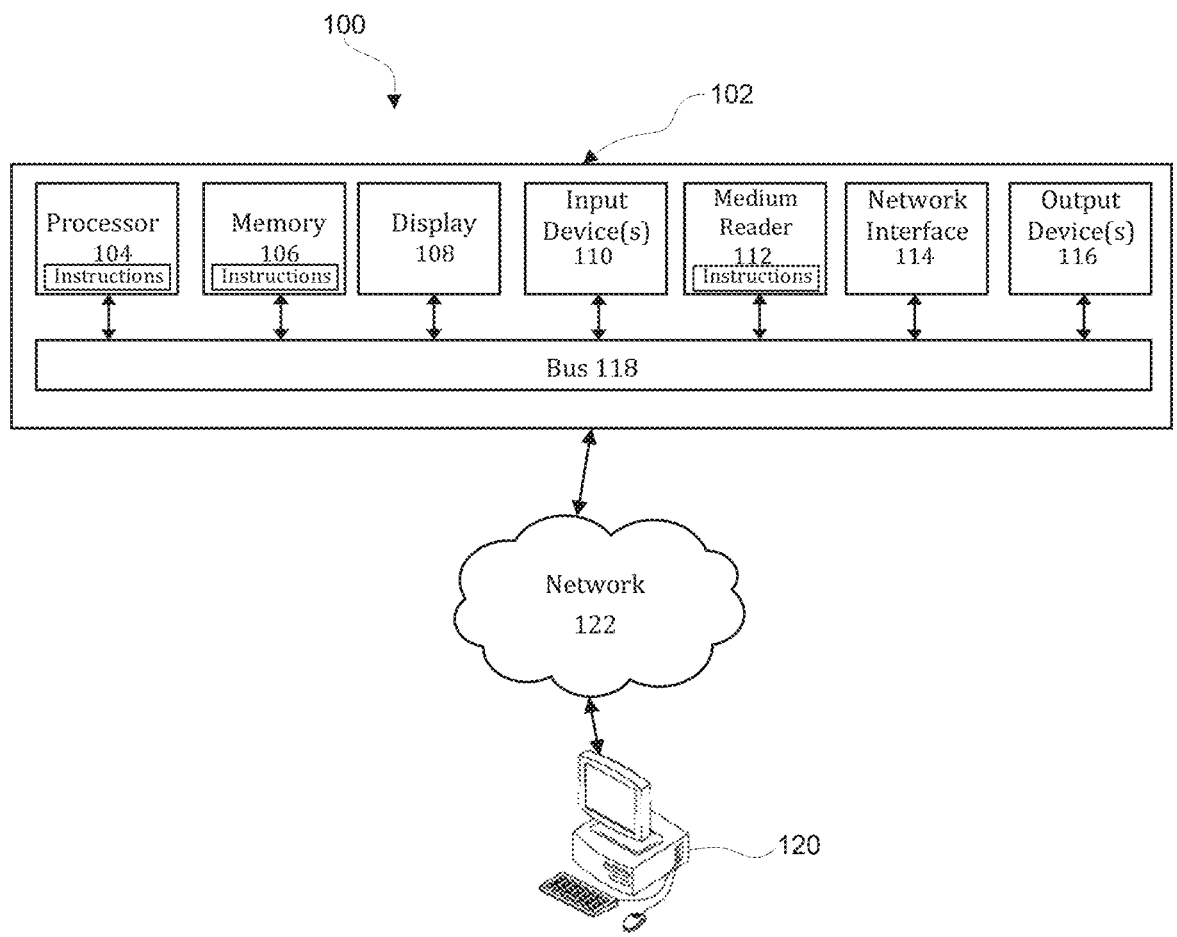
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for processing unstructured subpoena documents to extract relevant information regarding target entities, law enforcement agencies, and crime categories.

Figure 2:
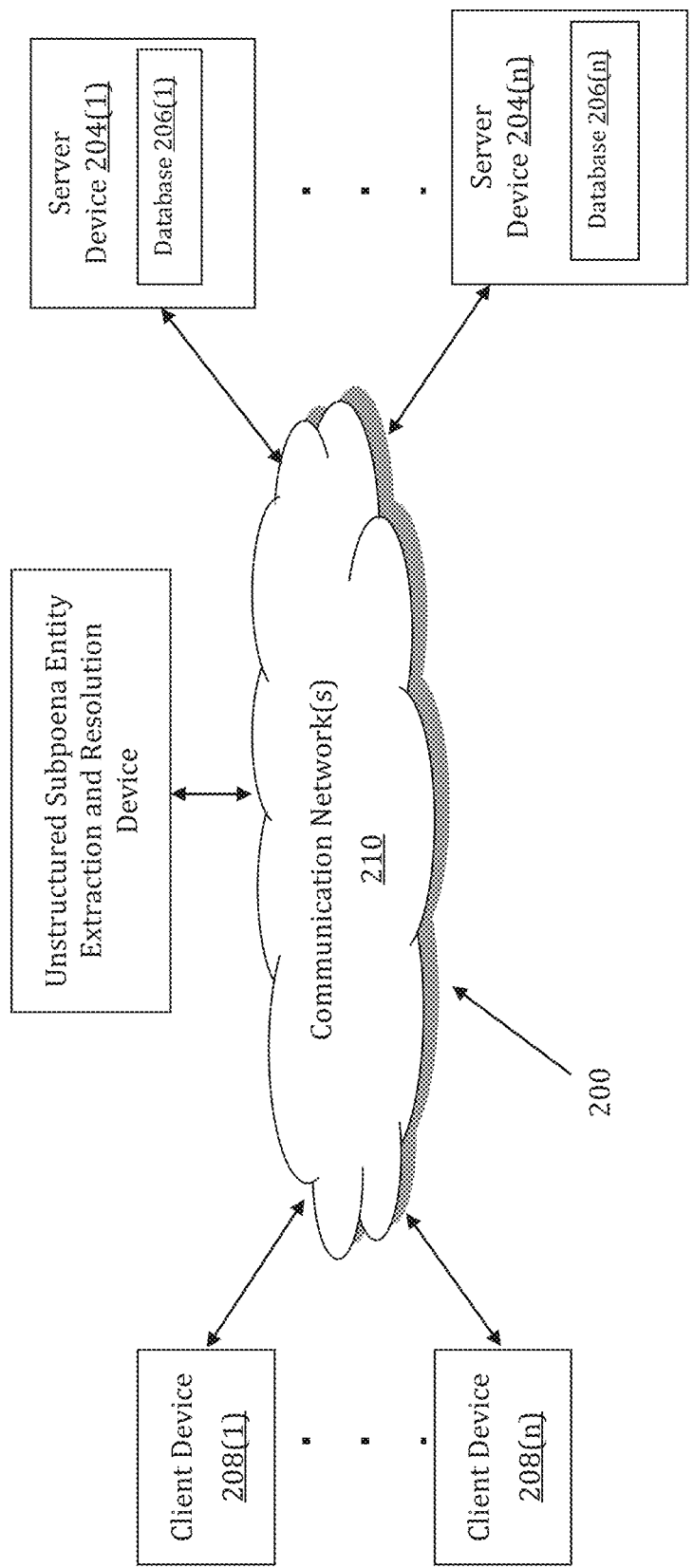
FIG. 2 illustrates an exemplary diagram of a network environment.

Referring to FIG. 2, a schematic of an exemplary network environment 200 for implementing a method for processing unstructured subpoena documents to extract relevant information regarding target entities, law enforcement agencies, and crime categories is illustrated. In an exemplary embodiment, the method is executable on any networked computer platform, such as, for example, a personal computer (PC).

The method for processing unstructured subpoena documents to extract relevant information regarding target entities, law enforcement agencies, and crime categories may be implemented by an Unstructured Subpoena Entity Extraction and Resolution (USEER) device 202. The USEER device 202 may be the same or similar to the computer system 102 as described with respect to FIG. 1. The USEER device 202 may store one or more applications that can include executable instructions that, when executed by the USEER device 202, cause the USEER device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the USEER device 202 itself, may be located in virtual server(s) running in a cloud-based computing environment rather than being tied to one or more specific physical network computing devices. Also, the application(s) may be running in one or more virtual machines (VMs) executing on the USEER device 202. Additionally, in one or more embodiments of this technology, virtual machine(s) running on the USEER device 202 may be managed or supervised by a hypervisor.

In the network environment 200 of FIG. 2, the USEER device 202 is coupled to a plurality of server devices 204(1)-204(n) that hosts a plurality of databases 206(1)-206(n), and also to a plurality of client devices 208(1)-208(n) via communication network(s) 210. A communication interface of the USEER device 202, such as the network interface 114 of the computer system 102 of FIG. 1, operatively couples and communicates between the USEER device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the USEER device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and USEER devices that efficiently implement a method for processing unstructured subpoena documents to extract relevant information regarding target entities, law enforcement agencies, and crime categories.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The USEER device 202 may be a standalone device or integrated with one or more other devices or apparatuses, such as one or more of the server devices 204(1)-204(n), for example. In one particular example, the USEER device 202 may include or be hosted by one of the server devices 204(1)-204(n), and other arrangements are also possible. Moreover, one or more of the devices of the USEER device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LRBT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to customer-specific information and data that relates to subpoena documents.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the USEER device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the USEER device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the USEER device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the USEER device 202, the server devices 204(1)-204(n), or the client devices 208(1)-208(n), for example, may be configured to operate as virtual instances on the same physical machine. In other words, one or more of the USEER device 202, the server devices 204(1)-204(n), or the client devices 208(1)-208(n) may operate on the same physical device rather than as separate devices communicating through communication network(s) 210. Additionally, there may be more or fewer USEER devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
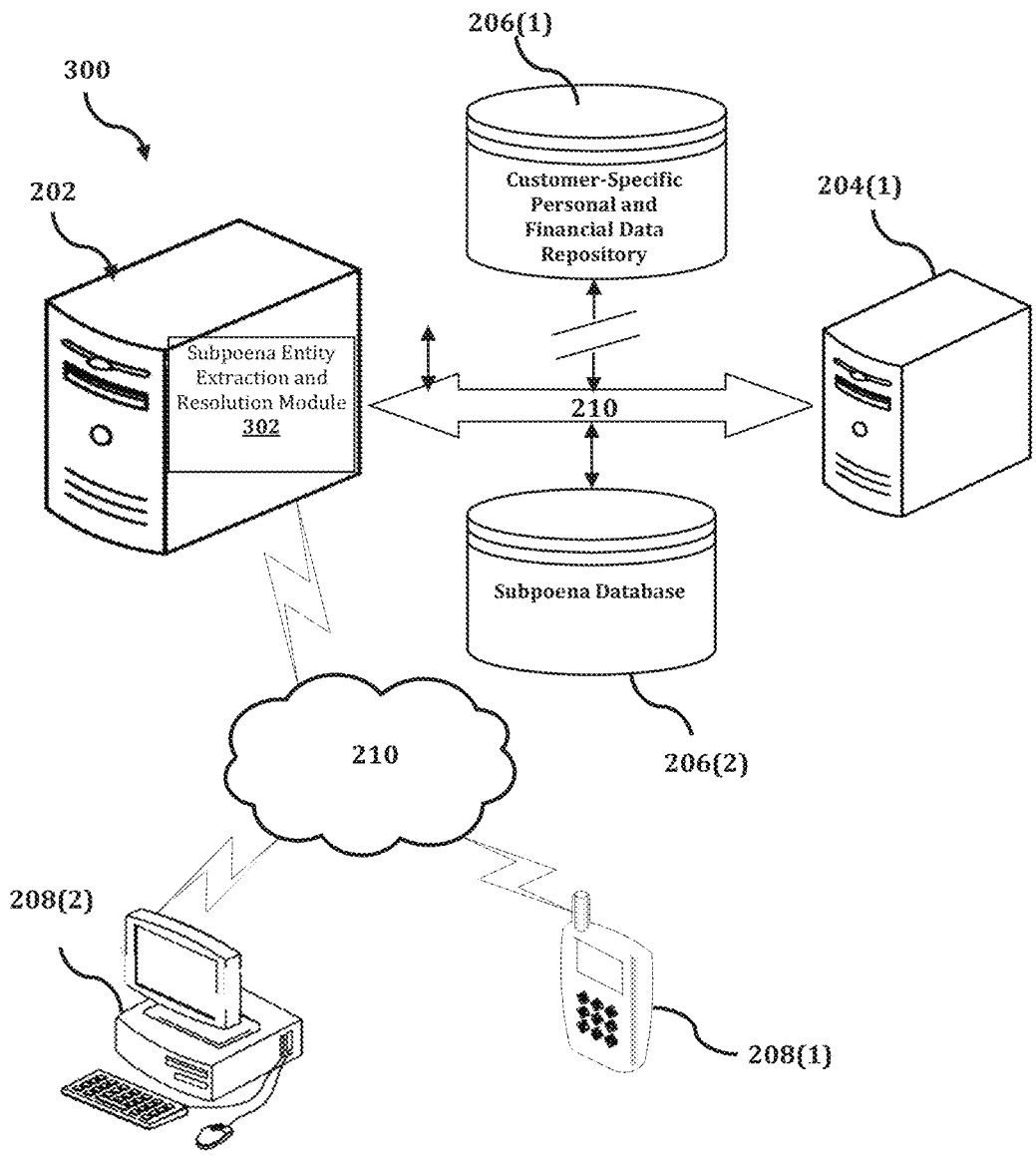
FIG. 3 shows an exemplary system for implementing a method for processing unstructured subpoena documents to extract relevant information regarding target entities, law enforcement agencies, and crime categories.

The USEER device 202 is described and illustrated in FIG. 3 as including a subpoena entity extraction and resolution module 302, although it may include other rules, policies, modules, databases, or applications, for example.

As will be described below, the subpoena entity extraction and resolution module 302 is configured to implement a method for processing unstructured subpoena documents to extract relevant information regarding target entities, law enforcement agencies, and crime categories.

An exemplary process 300 for implementing a mechanism for processing unstructured subpoena documents to extract relevant information regarding target entities, law enforcement agencies, and crime categories by utilizing the network environment of FIG. 2 is illustrated as being executed in FIG. 3. Specifically, a first client device 208(1) and a second client device 208(2) are illustrated as being in communication with USEER device 202. In this regard, the first client device 208(1) and the second client device 208(2) may be "clients" of the USEER device 202 and are described herein as such. Nevertheless, it is to be known and understood that the first client device 208(1) and/or the second client device 208(2) need not necessarily be "clients" of the USEER device 202, or any entity described in association therewith herein. Any additional or alternative relationship may exist between either or both of the first client device 208(1) and the second client device 208(2) and the USEER device 202, or no relationship may exist.

Further, USEER device 202 is illustrated as being able to access a customer-specific personal and financial data repository 206(1) and a subpoena database 206(2). The subpoena entity extraction and resolution module 302 may be configured to access these databases for implementing a method for processing unstructured subpoena documents to extract relevant information regarding target entities, law enforcement agencies, and crime categories.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the USEER device 202 via broadband or cellular communication. Of course, these embodiments are merely exemplary and are not limiting or exhaustive.

Upon being started, the subpoena entity extraction and resolution module 302 executes a process for processing unstructured subpoena documents to extract relevant information regarding target entities, law enforcement agencies, and crime categories. An exemplary process for processing unstructured subpoena documents to extract relevant information regarding target entities, law enforcement agencies, and crime categories is generally indicated at flowchart 400 in FIG. 4.

Figure 4:
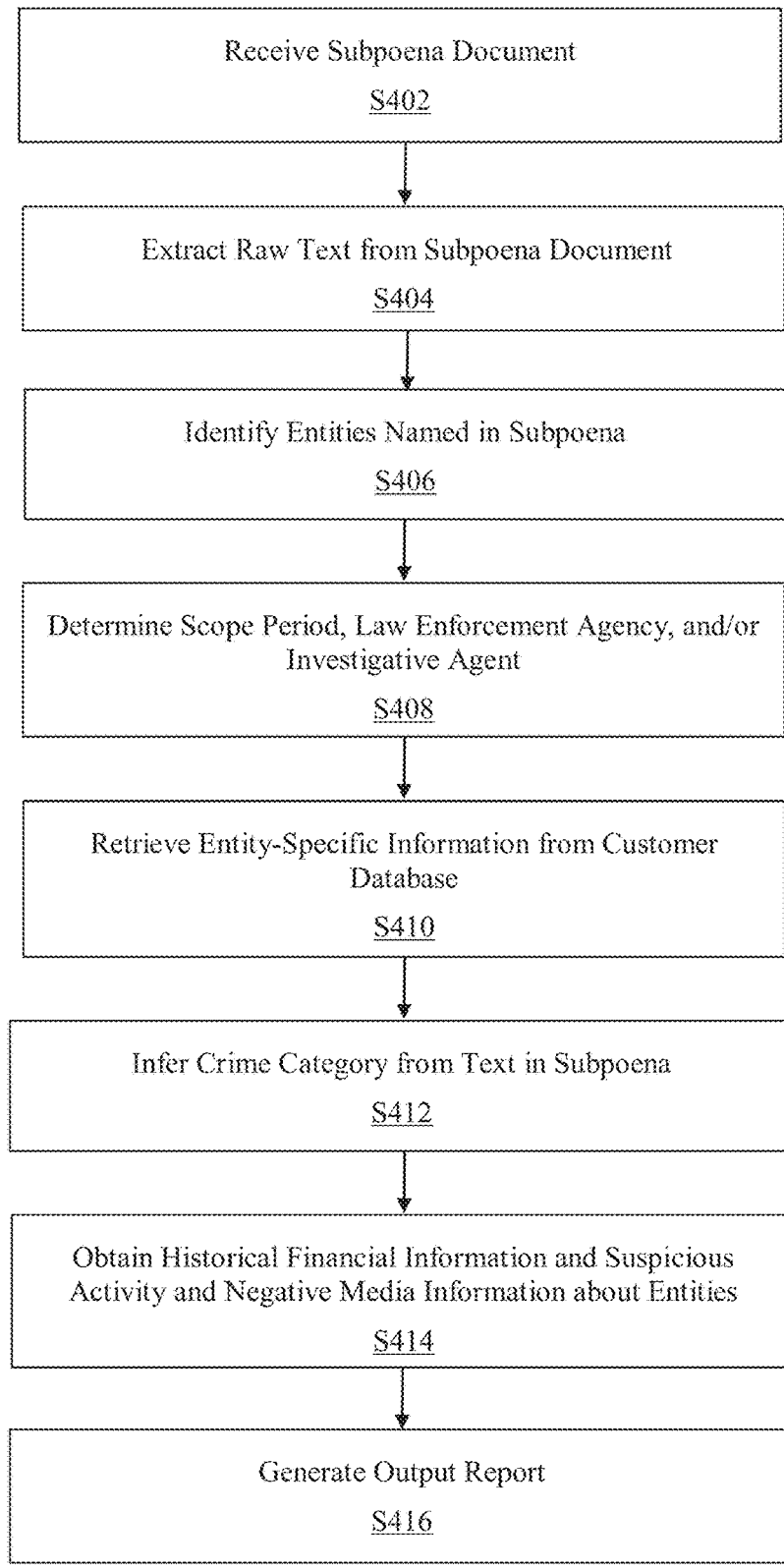
FIG. 4 is a flowchart of an exemplary process for implementing a method for processing unstructured subpoena documents to extract relevant information regarding target entities, law enforcement agencies, and crime categories.

In process 400 of FIG. 4, at step S402, the subpoena entity extraction and resolution module 302 receives a subpoena. A large financial institution, such as a bank, may receive many subpoenas on a daily basis, for example, on the order of dozens or hundreds of subpoenas in one day.

At step S404, the subpoena entity extraction and resolution module 302 extracts raw text information from the subpoena. In an exemplary embodiment, the subpoena may be in the form of a paper copy, and/or may be in the form of a scanned portable document format (PDF) file or an image PDF file, and as such, the extraction of raw text therefrom may be performed by using a scanner device that is configured to perform an optical character recognition (OCR) operation.

At step S406, the subpoena entity extraction and resolution module 302 identifies entities that are named in the subpoena based on the extracted raw text. The subpoena may name many individual persons or just one person; also, the subpoena may name a company or commercial organization, such as a corporation, or many such organizations may be named. In an exemplary embodiment, the entity identification may be performed by using a machine learning algorithm that applies a Natural Language Processing (NLP) technique to the raw text.

At step S408, the subpoena entity extraction and resolution module 302 uses the extracted raw text to determine a scope period of the subpoena, a law enforcement agency associated with the subpoena, and/or an investigative agency/agent that is associated with the subpoena. In an exemplary embodiment, these determinations may be made by using the same machine learning algorithm that applies an NLP technique to the raw text.

At step S410, the subpoena entity extraction and resolution module 302 obtains entity-specific information about each entity identified in step S406. In an exemplary embodiment, the entity-specific information may be included in a customer database, such as the customer-specific personal and financial data repository 206(1), and step S410 may be performed by retrieving the data from this customer database. The data to be retrieved may include, for example, any one or more of a name of a person, a name of a company or commercial entity, a date of birth, a social security number, a tax identification number, an account number, an address of a location, and a name of an organization associated with the entity.

In an exemplary embodiment, the subpoena entity extraction and resolution module 302 may perform a matching operation to match the identified entity with a name retrieved from the customer database. The matching operation may be implemented by executing a weighted fuzzy name matching algorithm that is described in further detail below.

At step S412, the subpoena entity extraction and resolution module 302 infers a crime category from the information determined in step S408. The crime category may include, for example, a crime relating to drug trafficking, a crime relating to terrorism, a crime relating to money laundering, a financial crime, and/or any other suitable crime category.

At step S414, the subpoena entity extraction and resolution module 302 obtains additional information that relates to the identified entities. In an exemplary embodiment, the additional information may include any one or more of a transaction history, historical investigational notes and information, know-your-customer (KYC) documentation, a suspicious activity report (SAR), and/or negative media information that relates to any of the identified entities.

At step S416, the subpoena entity extraction and resolution module 302 generates an output report. In an exemplary embodiment, the output report may have a standardized format. Alternatively, the output report may include information that is intended to be responsive to the subpoena, in order to facilitate providing a response to the applicable law enforcement agency.

The instant inventors have developed an artificial intelligence (AI)-based framework that uses Natural Language Processing (NLP) and Machine Learning at its core to effectively model entity extraction and resolution from huge unstructured subpoena documents. In an exemplary embodiment, the framework includes an algorithm that has a capability to read a large volume of subpoena documents, extract relevant information regarding the target entities, their unique identifiers, law enforcement agencies, and other relevant information from them, and finally resolve the entities by matching against an internal customer database to obtain the customer identifications.

Once the algorithm has extracted and resolved the target entities, the investigation on the targets become exponentially easier for human investigators. A highly manual and cumbersome task of processing each subpoena document, target extraction and resolution boils down to looking into a database containing all the information that the bank has on the target who has been subpoenaed.

In an exemplary embodiment, the algorithm leverages various techniques from the world of NLP to perform various tasks such as entity lookup, extracting entity identifiers, and contextual understanding and reasoning. As a result, an automated end-to-end subpoena target extraction and entity resolution pipeline is provided. This pipeline maximizes performance, significantly reduces manual intervention required, and minimizes cost and manpower. The algorithm is able to extract the date range from the subpoena document or infer the date range when absent in the document by examining transactions of the person. In addition, the crime category may be inferred by determining similarity of behavior with other crimes.

There is a financial benefit to developing a complete end-to-end autonomous target subpoena alert generating system wherein the approach helps reduce the time to analyze subpoenas from enormous numbers of man-months to few hours. This helps eliminate human error, makes the subpoena processing much faster, and hence reduces the expenses needed to manage and analyze the subpoenas.

Banks are repositories for vast amounts of financial information. This information may be useful to parties in lawsuits in which the bank is just an innocent bystander. Banks often receive requests, in the form of subpoenas, for financial information in matters in which the bank has no direct involvement. Upon receipt of a subpoena for financial information, i.e., a subpoena for the production of documents only, and not for testimony, the bank has a legal duty to produce its customers' financial information that is described in the subpoena. In an exemplary embodiment, a bank may receive approximately 5000 subpoenas every month.

The subpoena document is most commonly received in PDF format. Most of the documents are scanned or image PDF documents, and hence they require Optical Character Recognition (OCR). Software tools such as Tesseract are often used to process the subpoena documents and to extract the raw text included in the document. This is the input to the algorithms disclosed herein. The algorithms operate on this raw text to extract and normalize relevant information.

Figure 5:
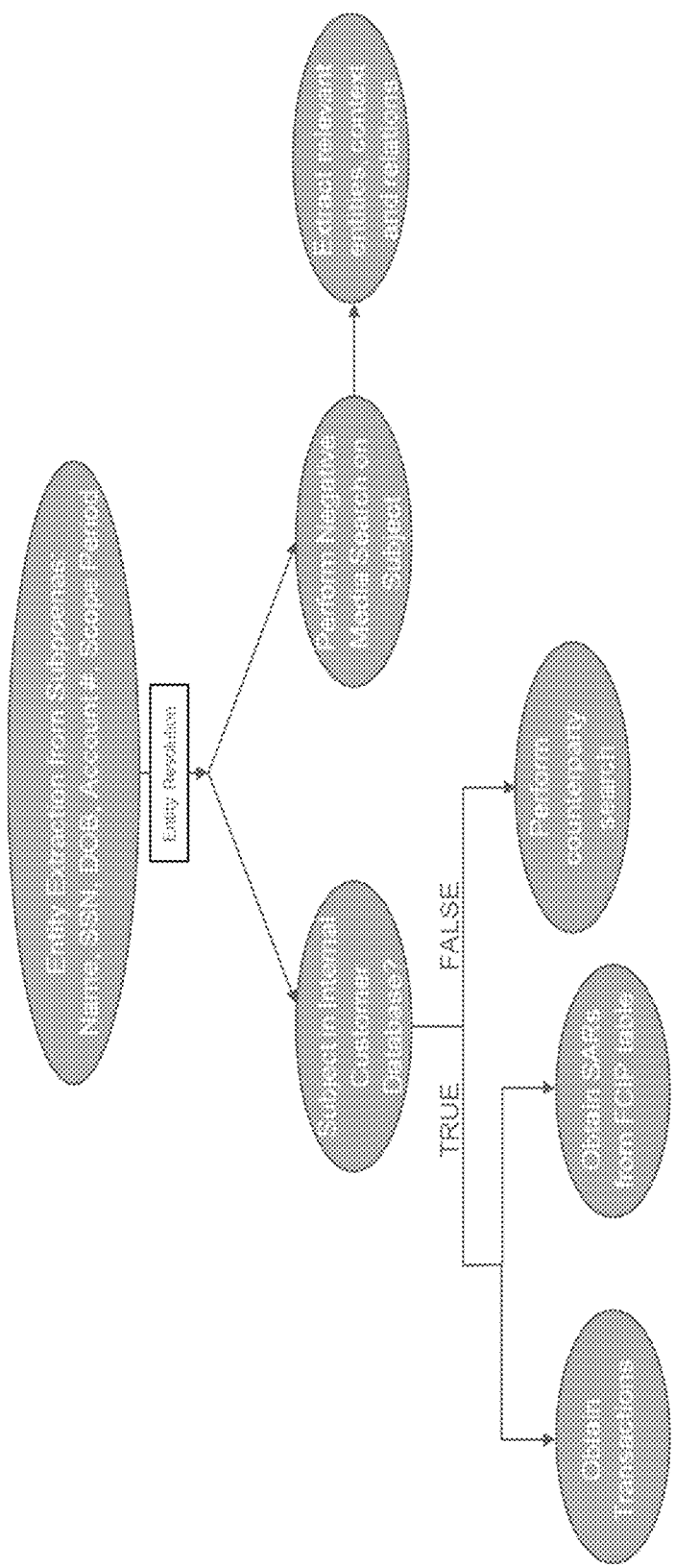
FIG. 5 is a workflow diagram that illustrates a method for processing unstructured subpoena documents to extract relevant information regarding target entities, law enforcement agencies, and crime categories, according to an exemplary embodiment.
Figure 6:
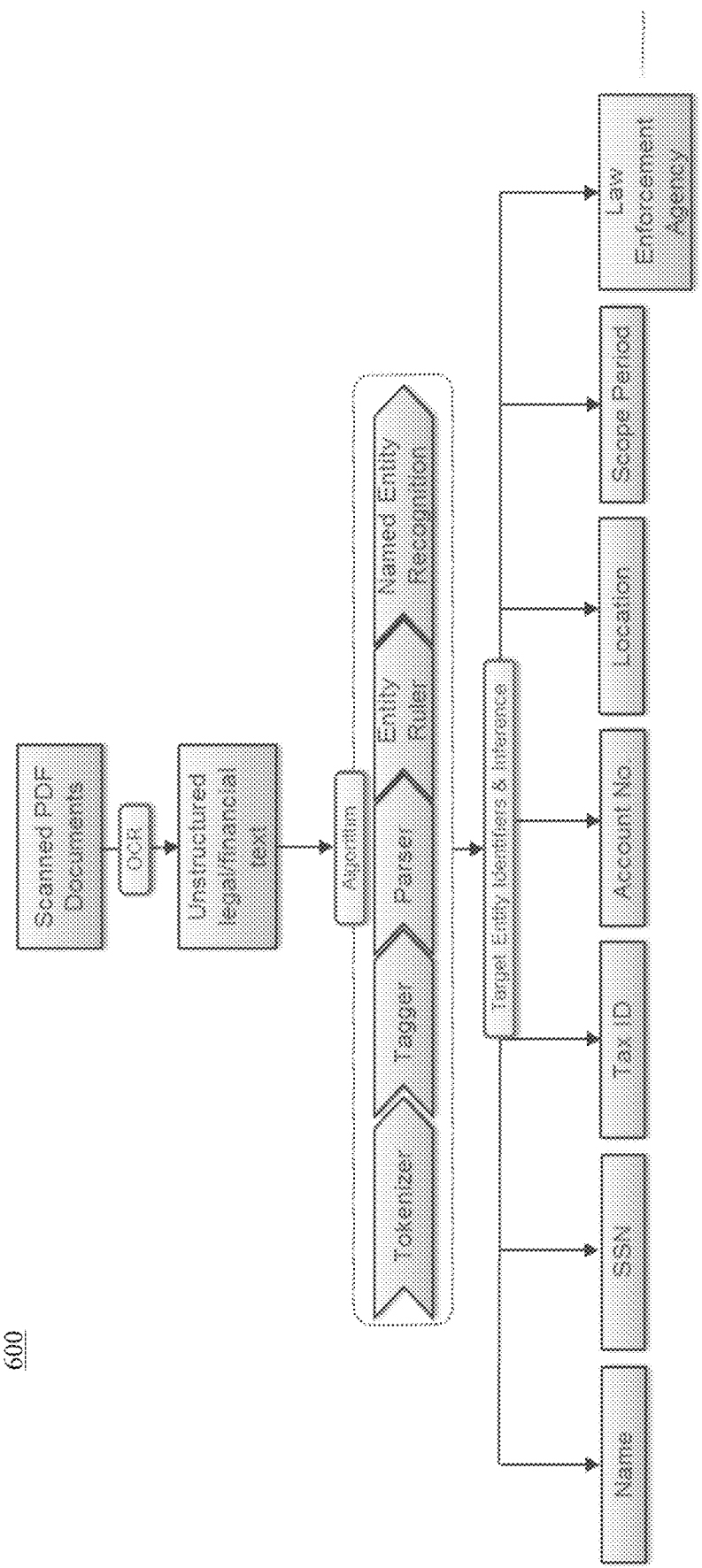
FIG. 6 is an entity extraction architecture diagram that illustrates a method for processing unstructured subpoena documents to extract relevant information regarding target entities, law enforcement agencies, and crime categories, according to an exemplary embodiment.

FIG. 5 is a workflow diagram 500 that illustrates a method for processing unstructured subpoena documents to extract relevant information regarding target entities, law enforcement agencies, and crime categories, according to an exemplary embodiment. FIG. 6 is an entity extraction architecture diagram 600 that illustrates a method for processing unstructured subpoena documents to extract relevant information regarding target entities, law enforcement agencies, and crime categories, according to an exemplary embodiment. In an exemplary embodiment, the problem may be understood along two dimensions: 1) entity extraction; and 2) entity resolution.

Entity extraction: The entity extraction step requires extraction of target entities, their unique identifiers, law enforcement agencies involved, and reasons behind the subpoena from unstructured raw subpoena text, as shown in FIG. 6. For this, a technique called Named Entity Recognition is used. This technique locates and classifies named entities in text into predefined categories, such as names of persons, organizations, locations, dates of birth, social security numbers, tax identification numbers, account numbers, scope periods, law enforcement agencies, and other suitable categories. For this step, pre-trained libraries spacy and lexnlp may be leveraged in order to identify token spans in the text and classify them into predefined labels. In order to tailor for the subpoenas, this may be augmented with entity rules that allow addition of named entities based on pattern dictionaries. This pipeline component finds matches in the text and adds them as entities using the specified pattern label as the entity label. This component facilitates an accurate extraction and labeling of entities including organizations, locations, date of birth, social security numbers, tax identification number, account numbers, scope period, and law enforcement agencies, as explained in Table 1.

TABLE 1

How Entities are Extracted from Each Subpoena Document

| # | Entities | Method |
|---|---|---|
| 1 | Name | Person Name: Named entities are extracted using the spaCy library wherein the Named Entity Recognition system within spacy features a sophisticated word embedding strategy using sub-word features and bloom embeddings, a deep convolutional neural network with residual connections, and a novel transition-based approach to named entity parsing. Company Name: Extraction of Company Names using LexNLP library wherein the extraction model has been specifically trained on legal and financial documents. |
| 2 | Social Security Number (SSN) | Customized Named entities are extracted using the Entity Ruler component within spaCy library that allows for adding named entities based on pattern dictionaries, which makes it easy to combine rule-based and statistical named entity recognition. For instance, one of the patterns for Social Security Number is 'XXX-XX-XXXX'. |
| 3 | Tax Identification Number (TIN) | Customized Named entities are extracted using the Entity Ruler component within spaCy library that allows for adding named entities based on pattern dictionaries, which makes it easy to combine rule-based and statistical named entity recognition. For instance, one of the patterns for Tax Identification Number is 'XX-XXXXXXX'. |
| 4 | Date of Birth (DOB) | Customized Named entities are extracted using the Entity Ruler component within spaCy library that allows for adding named entities based on pattern dictionaries, which makes it easy to combine rule-based and statistical named entity recognition. For instance, one of the patterns for Date of Birth is 'XX/XX/XXXX' |
| 5 | Address | Full Address: Extraction of Address using LexNEP library wherein the extraction model has been specifically trained on legal and financial documents. City: Extract Address Components which parses unstructured address strings into address components, using probabilistic model. |
| 6 | Account Number | Customized Named entities are extracted using the Entity Ruler component within spaCy library that allows for adding named entities based on pattern dictionaries, which makes it easy to combine rule-based and statistical named entity recognition. For instance, one of the patterns for Account Number is 'Account No. XXXXXXXXXX'. |

TABLE 1-continued

How Entities are Extracted from Each Subpoena Document

| # | Entities | Method |
|---|---|---|
| 7 | Scope Period | Customized Named entities are extracted using the Entity Ruler component within spaCy library that allows for adding named entities based on pattern dictionaries, which makes it easy to combine rule-based and statistical named entity recognition. For instance, one of the patterns for Scope Period is 'from 1 Jan. 0000 to Present'. |
| 8 | Issuing Court Name | Extraction of US Courts using LexNLP library wherein the extraction model has been specifically trained on legal and financial documents. |
| 9 | Investigator Agents | Customized Named entities are extracted using the Entity Ruler component within spaCy library that allows for adding named entities based on pattern dictionaries, which makes it easy to combine rule-based and statistical named entity recognition. For instance, one of the patterns for Investigator Agents is 'Special Agent Jane Doe'. |

The algorithm achieved an average of 95% accuracy on a sample of subpoena documents. Further, a calibration module for which the accuracy of entity extraction for each document is calibrated based on frequently observed errors may also be used. This calibration helps businesses to identify documents which require human intervention, thus significantly reducing the likelihood of failure.

Figure 7:
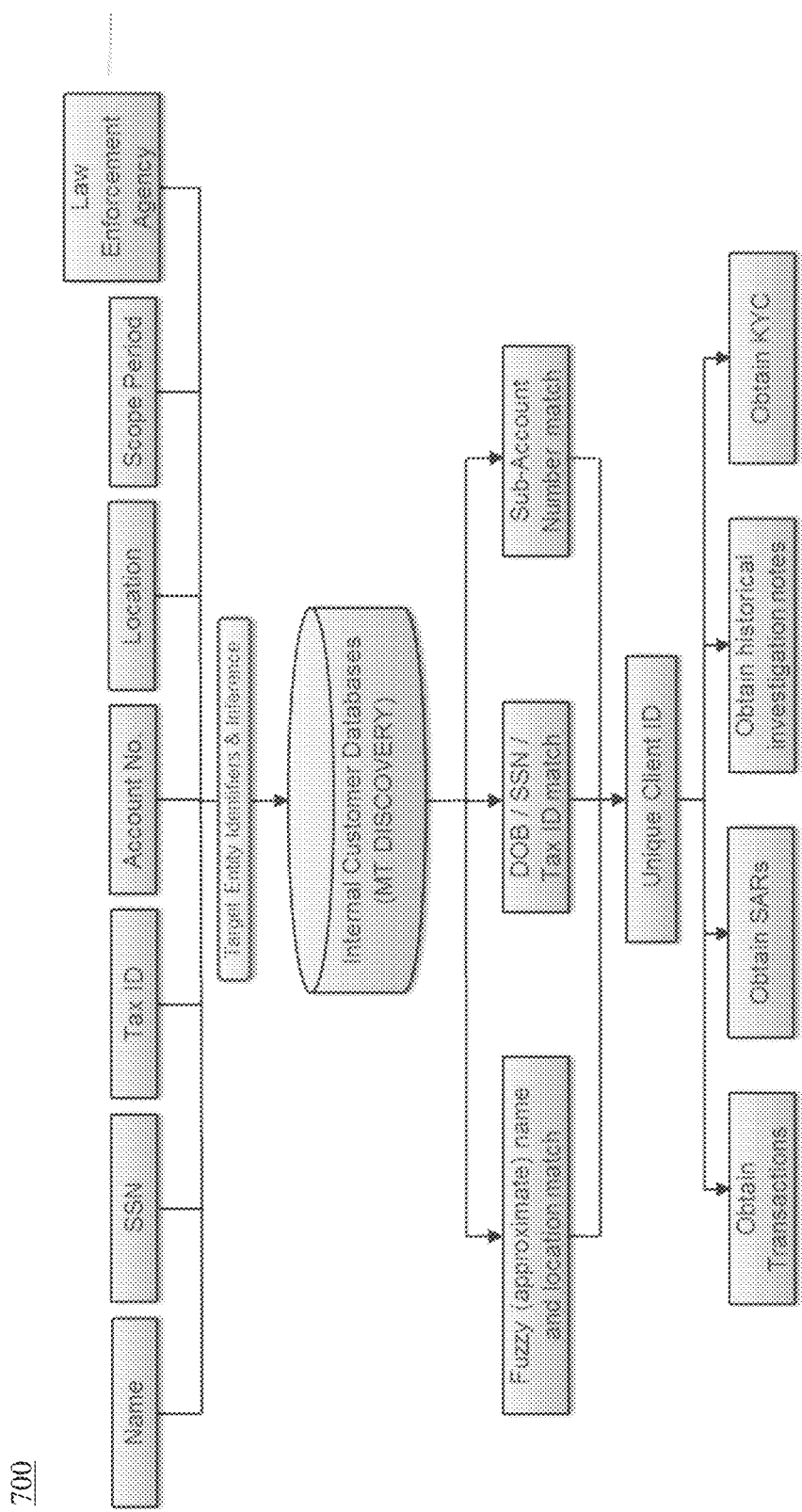
FIG. 7 is an entity resolution architecture diagram that illustrates a method for processing unstructured subpoena documents to extract relevant information regarding target entities, law enforcement agencies, and crime categories, according to an exemplary embodiment.

Entity Resolution: Once the target entity information and their unique identifiers are extracted, entity resolution is performed. For this, the target identifiers are matched with an organization's internal customer database to obtain the customer identifications. If the targets are not found, a counterparty search may be performed. FIG. 7 is an entity resolution architecture diagram 700 that illustrates a method for processing unstructured subpoena documents to extract relevant information regarding target entities, law enforcement agencies, and crime categories, according to an exemplary embodiment.

1) Social Security Number (SSN), Tax Identification Number (TIN), and Date of Birth (DOB): Because a large bank's internal customer database may include a very large number of records, i.e., on an order of magnitude of millions, these identifiers are first used to filter the records. The final resolution using the name of the entity, if given, is then performed on the remaining records. 2) Name. The targets of a subpoena can be either an individual person or companies.

2a) Person Name: In order to match the person names against the bank's internal customer name database, a weighted fizzy name match algorithm may be used. It has been most commonly observed that the first and last name of a person is more frequently present in the subpoena documents than first, middle and last name of a person. Hence, in an exemplary embodiment, the weighted fuzzy name match algorithm has two dimensions: 1) Calculating Levenshtein Distance between the name and the internal customer name database: Levenshtein distances are calculated between first name, middle name and last name of the entity and the internal customer name database separately (i.e., lev(FN, ICD), lev(MN, ICD), and lev(LN, ICD) respectively). The Levenshtein distance between two strings a and b is calculated using below Formula 1:

Formula 1

$$\mathrm{lev}(a, b) = \begin{cases} [a] & \text{if } [b] = 0, \\ [b] & \text{if } [a] = 0, \\ \mathrm{lev}(\mathrm{tail}(a), \mathrm{tail}(b)) & \text{if } a[0] = b[0] \\ 1 + \min \begin{cases} \mathrm{lev}(\mathrm{tail}(a), b) \\ \mathrm{lev}(a, \mathrm{tail}(b)) \\ \mathrm{lev}(\mathrm{tail}(a), \mathrm{tail}(b)) \end{cases} & \text{otherwise,} \end{cases}$$

Performing Weighted Average: Weighted average is then performed on the three Levenshtein distances calculated in the previous step, i.e., lev(FN, ICD), lev(MN, ICD), and lev(LN, ICD) with weights $w_1$, $w_2$ and $w_3$ respectively. Upon calibration, it has been observed that the best performance is obtained when $w_1=0.45$, $w_2=0.1$, and $w_3=0.45$.

Weighted Score=0.45*lev(*FN,ICD*)+0.1*lev(*MN, ICD*)+0.45*lev(*LN,ICD*)

A higher weighted score corresponds to a greater similarity between the two strings being compared.

2b) Company Name: Firstly, the most common corporate endings in the legal entity, such as LLC, INC, CORP, etc., are removed from the target name. Levenshtein distances is then calculated between target name and the internal customer name database using Formula 1 as described above.

3) Address: In some subpoenas, locations are provided as identifiers for the target entity. In this case, the internal customer database records may first be filtered based on 'City', obtained from the entity extraction task. Levenshtein distances may then calculated between the remaining address component of the target and the filtered internal customer location database (lev (ADDR, Filt-ICD)) using Formula 1. Additionally, a Levenshtein distance may also be calculated between a target name and the filtered internal customer name database (lev (Name, Filt-ICD)) using Formula 1. Finally, ranks are calculated for both lev (ADDR, Filt-ICD) and lev (Name, Filt-ICD), and a geometric mean is calculated with respect to the ranks. A lower mean rank corresponds to a higher degree of similarity between the two strings.

4) Account Number: Some subpoena documents directly provide account numbers for which detailed information is requested. The account numbers stated in the document may vary according to the starting N digits or ending N digits of the actual full account number. Hence the account numbers have been resolved using a "containing" feature which makes sure that those records are obtained whenever the N digits are present together anywhere in the internal customer account number databases.

This information is then used to obtain transactions related to those targets, as well as to obtain any suspicious activity reports (SARs) relating those targets, if any. For each subpoena target, an alert is generated that contains target information, the reason behind the subpoenas, and related transactions and SARs. Moreover, the target information is also used to perform a negative media search and to extract relevant entity information, context and relations.

According to an exemplary embodiment, a fully automated end-to-end pipeline of generating target subpoena alerts by extracting the list of entities together with relevant entity details from the subpoena documents, augmenting with their resolution including the target's related transactions and suspicious activity reports, if any, is disclosed herein.

In an exemplary embodiment, dates may also be extracted from subpoenas, which has an effect of putting a bounding box with respect to a timing of relevant transactions. If the dates are absent, then dates may be inferred by examining the transaction history to detect potentially relevant transactions. Similarly, the documents often do not contain a crime category; then, negative media and transactions may be examined to compute behavior similarity with other crimes in order to infer the crime category.

Figure 8:
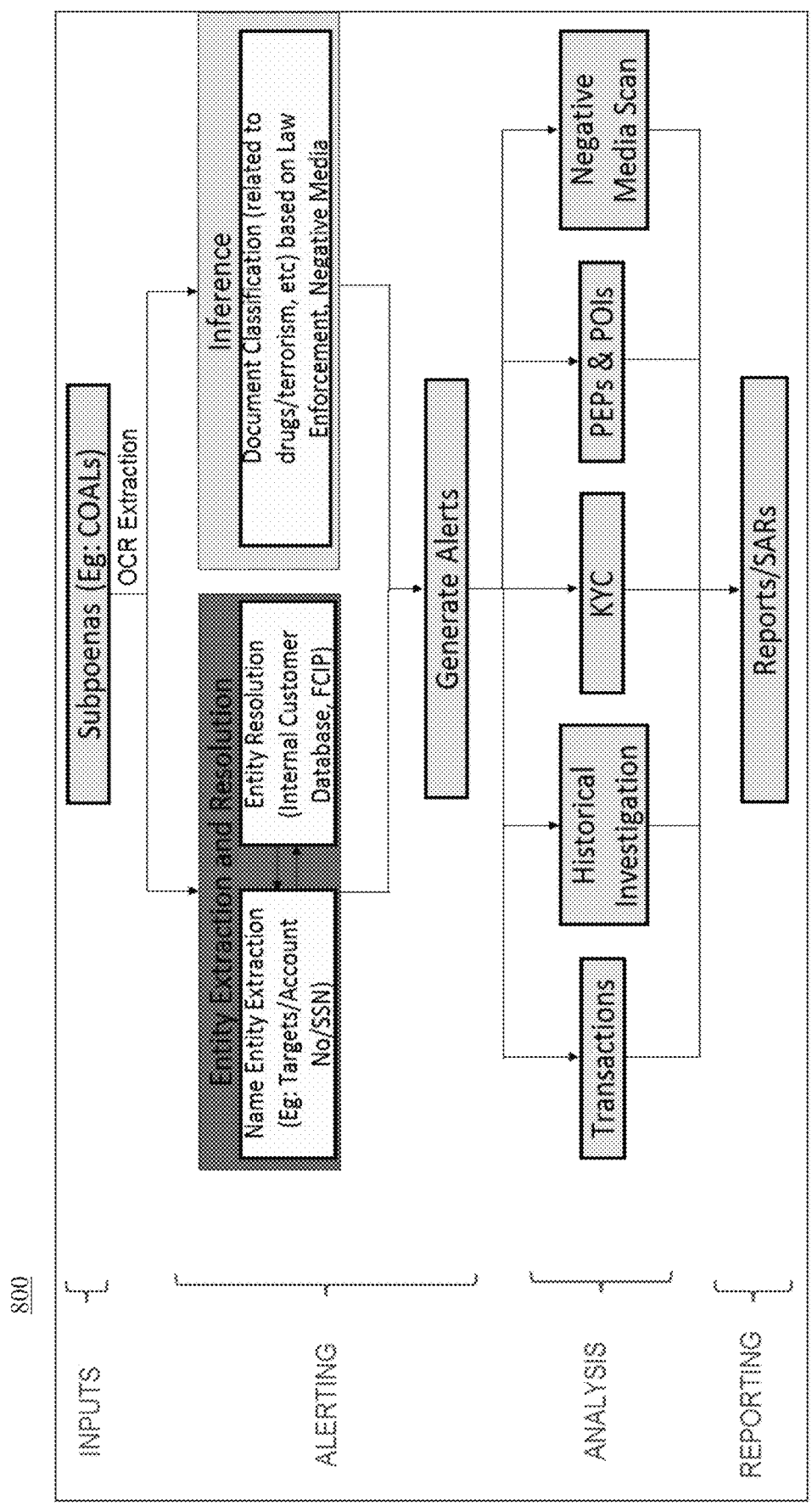
FIG. 8 is a system architecture diagram that illustrates a method for processing unstructured subpoena documents to extract relevant information regarding target entities, law enforcement agencies, and crime categories, according to an exemplary embodiment.

System Architecture: FIG. 8 is a system architecture diagram 800 that illustrates a method for processing unstructured subpoena documents to extract relevant information regarding target entities, law enforcement agencies, and crime categories, according to an exemplary embodiment. The system architecture diagram 800 demonstrates the system architecture and illustrates how data flows through the pipeline. The algorithm reads a large volume of subpoena documents, extracts relevant information regarding the target entities, their unique identifiers, law enforcement agencies, and other information from them, and finally resolves the entities by matching against an internal customer database to obtain the customer identifications. Additionally, the crime category is inferred using the information provided in the subpoena or triaging negative media, and transactions, to compute behavior similarity with other crimes to infer the category.

Once the customer identifications are obtained, all the information regarding that customer within the internal customer database including transaction history, previous investigation notes, know your customer documents, and other relevant information is obtained. This is then used for final reporting purposes to the law enforcement agencies that issued the subpoena.

Figure 9:
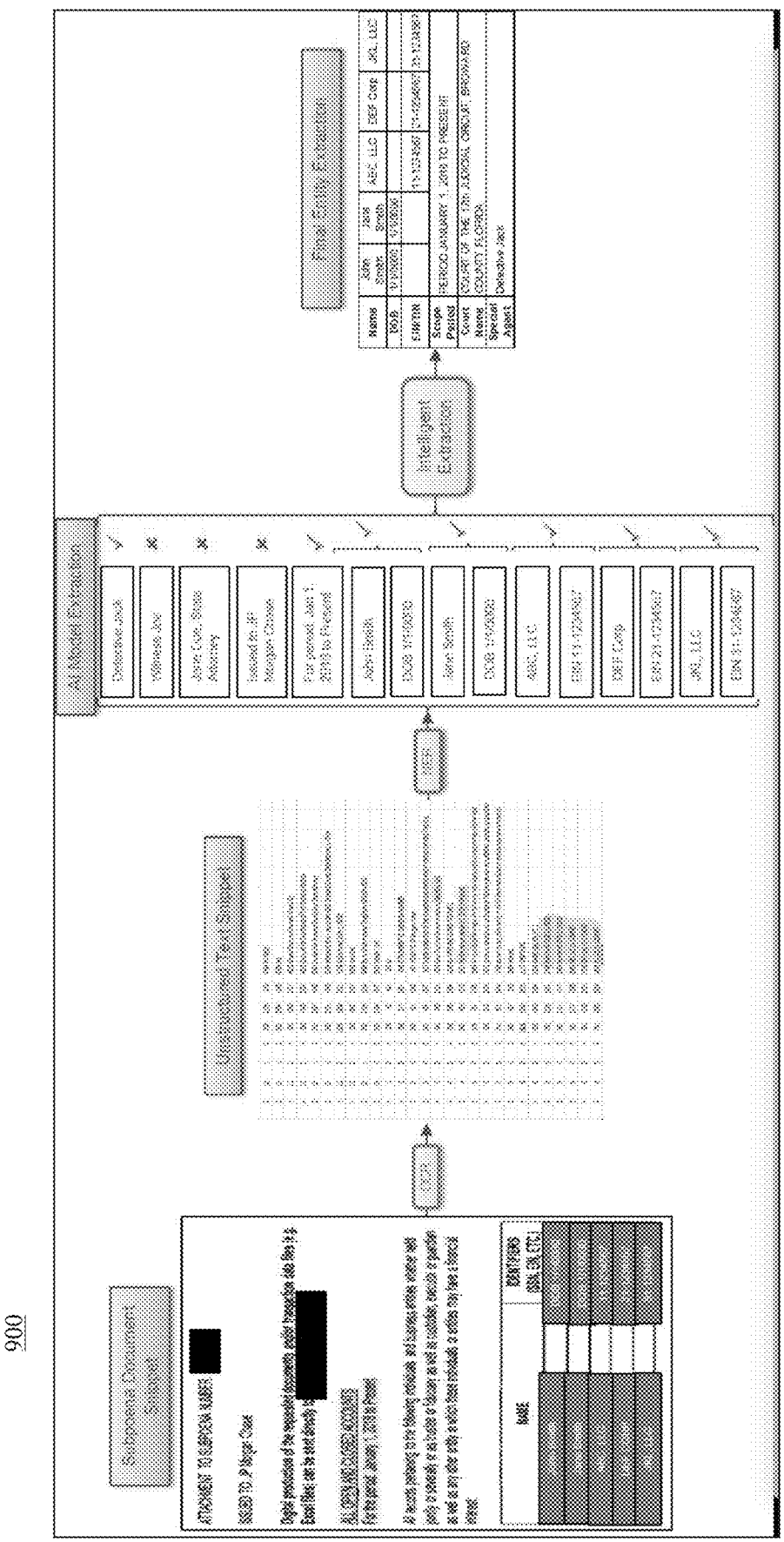
FIG. 9 is an entity extraction workflow example that illustrates a method for processing unstructured subpoena documents to extract relevant information regarding target entities, law enforcement agencies, and crime categories, according to an exemplary embodiment.

FIG. 9 is an entity extraction workflow example 900 that illustrates a method for processing unstructured subpoena documents to extract relevant information regarding target entities, law enforcement agencies, and crime categories, according to an exemplary embodiment.

Entity Extraction: As also described above, a subpoena document contains target names, identifiers, scope period, law enforcement agency, investigative agents. Optical character recognition (OCR) is first used to extract the raw text from the subpoena document, and the extracted raw text is then passed through an entity extraction algorithm. Finally, an intelligent extraction is performed to filter unnecessary noise, as illustrated in FIG. 9.

Figure 10:
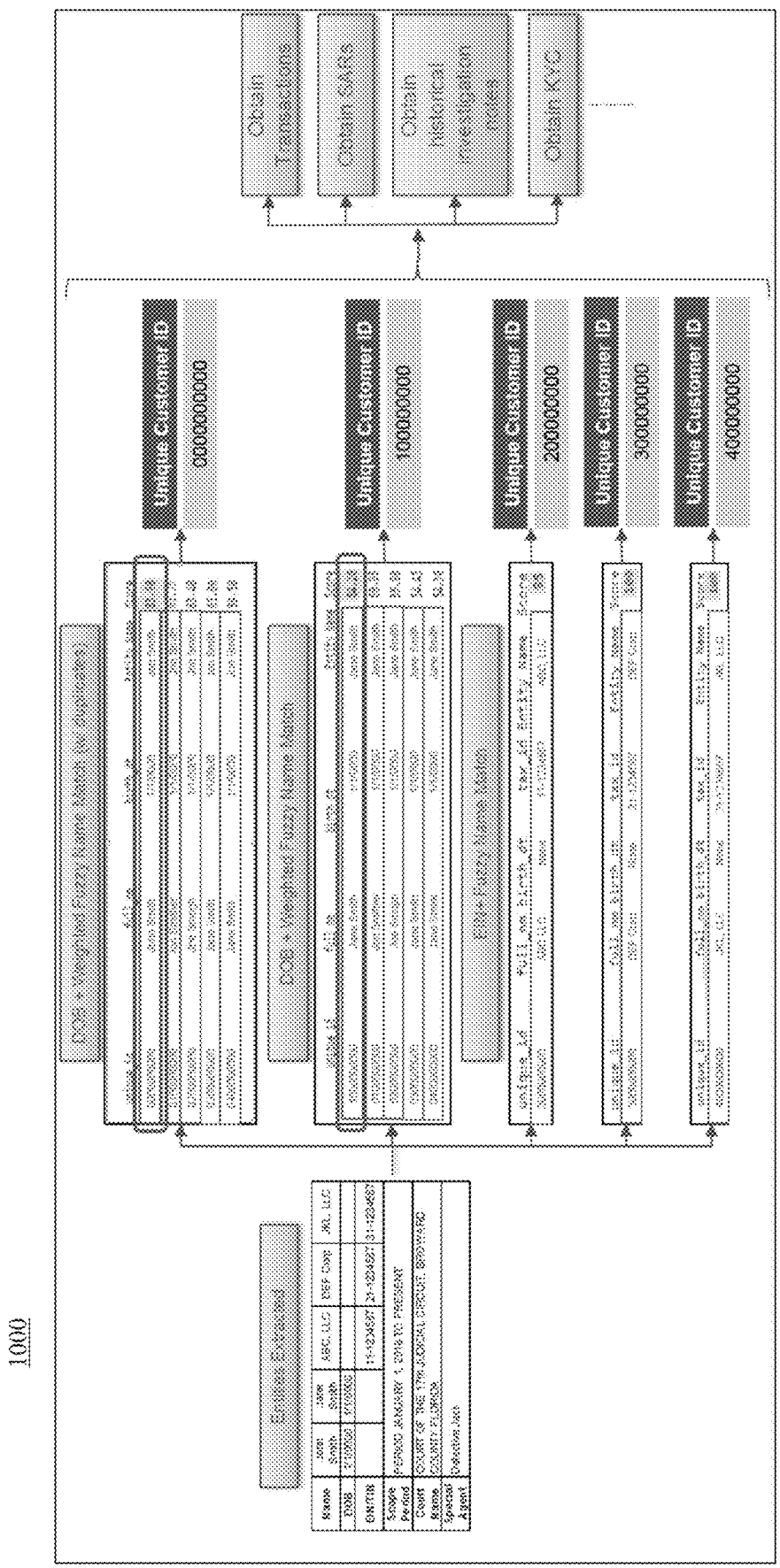
FIG. 10 is an entity resolution workflow example that illustrates a method for processing unstructured subpoena documents to extract relevant information regarding target entities, law enforcement agencies, and crime categories, according to an exemplary embodiment.

FIG. 10 is an entity resolution workflow example 1000 that illustrates a method for processing unstructured subpoena documents to extract relevant information regarding target entities, law enforcement agencies, and crime categories, according to an exemplary embodiment.

Entity Resolution: The entity names, identifiers, scope period, law enforcement agency, investigative agents, and other relevant information obtained from the entity extraction is then passed through an entity resolution algorithm to obtain the unique customer identification information from an internal customer database. The customer identification is then used to obtain all the information regarding the customer that is present in internal databases, and this information is then used for final reporting purposes to the law enforcement agencies who issued the subpoena, as illustrated in FIG. 10.

Accordingly, with this technology, an optimized process for processing unstructured subpoena documents to extract relevant information regarding target entities, law enforcement agencies, and crime categories is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for extracting information from a subpoena document, the method being implemented by at least one processor, the method comprising:

receiving, by the at least one processor, a subpoena document;

extracting, by the at least one processor, raw text included in the subpoena document;

identifying, by the at least one processor based on the extracted raw text, at least one entity that is named in the subpoena document by applying an artificial intelligence (AI) based framework that uses Natural Language Processing (NLP) and machine learning to implement an algorithm for the identifying of the at least one entity;

filtering, by the at least one processor, the identified at least one entity to extract at least one final entity by applying the AI framework to remove noise, wherein the at least one final entity includes at least one of a target entity, law enforcement agency, and crime category;

determining, by the at least one processor based on the extracted raw text, first information that relates to at least one from among a scope period associated with the subpoena document, a law enforcement agency associated with the subpoena document, and an investigative agent associated with the subpoena document by applying the AI framework to implement the algorithm for the determining of the first information;

obtaining, by the at least one processor, second information that relates to the at least one final entity; and outputting, by the at least one processor, a subset of the determined first information and a subset of the obtained second information.

2. The method of claim 1, wherein the extracting of the raw text comprises scanning the subpoena document with a device configured to perform an optical character recognition operation.

3. The method of claim 1, wherein the obtaining of the second information comprises retrieving the second information from a database that includes customer-specific information.

4. The method of claim 3, wherein the second information includes at least one from among a name of a person, a name of a company, a date of birth, a social security number, a tax identification number, an account number, an address of a location, and an organization associated with the at least one final entity.

5. The method of claim 4, further comprising matching the at least one final entity with a name retrieved from the database that includes the customer-specific information by using a weighted fuzzy name match algorithm that calculates the Levenshtein distance between the at least one final entity and the name retrieved from the database.

6. The method of claim 1, further comprising inferring a crime category associated with the subpoena document by comparing a behavior of a crime in the subpoena document with at least one similar behavior provided in at least one of negative media and transactions of other crimes.

7. The method of claim 1, further comprising obtaining third information that includes at least one from among a transaction history of the at least one final entity, historical investigation information that relates to the at least one final entity, know your customer (KYC) information that relates to the at least one final entity, a suspicious activity report (SAR) that relates to the at least one final entity, and negative media information that relates to the at least one final entity.

8. The method of claim 7, further comprising generating a report that includes information that is responsive to requests included in the subpoena document based on the obtained second information and the obtained third information.

9. A computing apparatus for extracting information from a subpoena document, the computing apparatus comprising:

a processor;

a memory; and a communication interface coupled to each of the processor and the memory, wherein the processor is configured to:

receive, via the communication interface, a subpoena document;

extract raw text included in the subpoena document;

identify, based on the extracted raw text, at least one entity that is named in the subpoena document by applying an artificial intelligence (AI) based framework that uses Natural Language Processing (NLP) and machine learning to implement an algorithm for the identifying of the at least one entity;

filter, by the at least one processor, the identified at least one entity to extract at least one final entity by applying the AI framework to remove noise, wherein the at least one final entity includes at least one of a target entity, law enforcement agency, and crime category;

determine, based on the extracted raw text, first information that relates to at least one from among a scope period associated with the subpoena document, a law enforcement agency associated with the subpoena document, and an investigative agent associated with the subpoena document by applying the AI framework to implement the algorithm for the determining of the first information;

obtain second information that relates to the at least one final entity; and output a subset of the determined first information and a subset of the obtained second information.

10. The computing apparatus of claim 9, wherein the processor is further configured to extract the raw text by scanning the subpoena document with a device configured to perform an optical character recognition operation.

11. The computing apparatus of claim 9, wherein the processor is further configured to retrieve the second information from a database that includes customer-specific information and is stored in the memory.

12. The computing apparatus of claim 11, wherein the second information includes at least one from among a name of a person, a name of a company, a date of birth, a social security number, a tax identification number, an account number, an address of a location, and an organization associated with the at least one final entity.

13. The computing apparatus of claim 12, wherein the processor is further configured to match the at least one final entity with a name retrieved from the database that includes the customer-specific information by using a weighted fuzzy name match algorithm that calculates the Levenshtein distance between the at least one final entity and the name retrieved from the database.

14. The computing apparatus of claim 9, wherein the processor is further configured to infer a crime category associated with the subpoena document by comparing a behavior of a crime in the subpoena document with at least one similar behavior provided in at least one of negative media and transactions of other crimes.

15. The computing apparatus of claim 9, wherein the processor is further configured to obtain third information that includes at least one from among a transaction history of the at least one final entity, historical investigation information that relates to the at least one final entity, know your customer (KYC) information that relates to the at least one final entity, a suspicious activity report (SAR) that relates to the at least one final entity, and negative media information that relates to the at least one final entity.

16. The computing apparatus of claim 15, wherein the processor is further configured to generate a report that includes information that is responsive to requests included in the subpoena document based on the obtained second information and the obtained third information.

17. A non-transitory computer readable storage medium storing instructions for extracting information from a subpoena document, the storage medium comprising executable code which, when executed by a processor, causes the processor to:

receive a subpoena document;

extract raw text included in the subpoena document;

identify, based on the extracted raw text, at least one entity that is named in the subpoena document by applying an artificial intelligence (AI) based framework that uses Natural Language Processing (NLP) and machine learning to implement an algorithm for the identifying of the at least one entity;

filter, by the at least one processor, the identified at least one entity to extract at least one final entity by applying the AI framework to remove noise, wherein the at least one final entity includes at least one of a target entity, law enforcement agency, and crime category;

determine, based on the extracted raw text, first information that relates to at least one from among a scope period associated with the subpoena document, a law enforcement agency associated with the subpoena document, and an investigative agent associated with the subpoena document by applying the AI framework to implement the algorithm for the determining of the first information;

obtain second information that relates to the at least one final entity; and output a subset of the determined first information and a subset of the obtained second information.

* * * * *